(12) United States Patent
Fan et al.

(10) Patent No.: US 8,972,734 B2
(45) Date of Patent: Mar. 3, 2015

(54) SYMMETRIC DYNAMIC AUTHENTICATION AND KEY EXCHANGE SYSTEM AND METHOD THEREOF

(71) Applicant: National Sun Yat-Sen University, Kaohsiung (TW)

(72) Inventors: Chun-I Fan, Kaohsiung (TW); Ruei-Hau Hsu, Kaohsiung (TW); Yi-Hui Lin, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 60 days.

(21) Appl. No.: 13/926,205

(22) Filed: Jun. 25, 2013

(65) Prior Publication Data
US 2014/0115337 A1   Apr. 24, 2014

(30) Foreign Application Priority Data
Oct. 23, 2012   (TW) .............................. 101139096 A

(51) Int. Cl.
*H04L 9/08* (2006.01)
*H04L 29/06* (2006.01)

(52) U.S. Cl.
CPC .............. *H04L 63/08* (2013.01); *H04L 63/061* (2013.01); *H04L 29/06* (2013.01)
USPC ........................................ 713/171; 380/277

(58) Field of Classification Search
CPC ....... H04L 9/0833; H04L 9/0816; H04L 9/12; H04L 63/061; H04L 63/065
USPC .......................................... 713/171; 380/277
See application file for complete search history.

(56) References Cited

U.S. PATENT DOCUMENTS

| 7,095,850 | B1 | 8/2006 | McGrew | |
|---|---|---|---|---|
| 7,428,637 | B1 * | 9/2008 | Billman et al. | 713/168 |
| 7,502,925 | B2 | 3/2009 | Maufer et al. | |
| 7,565,537 | B2 | 7/2009 | Morais et al. | |
| 2004/0025018 | A1 * | 2/2004 | Haas et al. | 713/168 |
| 2006/0242687 | A1 * | 10/2006 | Thione et al. | 726/4 |
| 2009/0054036 | A1 * | 2/2009 | Chen et al. | 455/411 |

(Continued)

FOREIGN PATENT DOCUMENTS

| CN | 101442403 | 5/2009 |
|---|---|---|
| CN | 101478390 | 7/2009 |
| TW | 200522636 | 7/2005 |

*Primary Examiner* — Matthew Smithers
(74) *Attorney, Agent, or Firm* — Muncy, Geissler, Olds & Lowe, P.C.

(57) ABSTRACT

A symmetric dynamic authentication and key exchange system and a method thereof are provided. A client and a server obtain initial authentication information at the same time, the client generates first one-time temporary authentication information, a conference key and a standby identity identifier according to the initial authentication information, and transmits them to the server, and the server performs a dynamic authentication program. The server compares the initial authentication information of the client with the conference key to confirm an identity of the client, and then updates the initial authentication information of the server according to the first one-time temporary authentication information, and the server is enabled to have the first one-time temporary authentication information the same as that of the client, and then to generate second one-time temporary authentication information including the standby identity identifier according to the first one-time temporary authentication information and the initial authentication information.

9 Claims, 5 Drawing Sheets

(56) References Cited

U.S. PATENT DOCUMENTS

| | | | |
|---|---|---|---|
| 2012/0189122 A1* | 7/2012 | Huang et al. | 380/270 |
| 2012/0204032 A1* | 8/2012 | Wilkins et al. | 713/170 |
| 2012/0303960 A1* | 11/2012 | Wankmueller et al. | 713/169 |
| 2013/0223629 A1* | 8/2013 | Huang et al. | 380/278 |

* cited by examiner

SYMMETRIC DYNAMIC AUTHENTICATION AND KEY EXCHANGE SYSTEM AND METHOD THEREOF

CROSS-REFERENCE TO RELATED APPLICATION

This application claims the benefit of Taiwan Patent Application No. 101139096, filed on Oct. 23, 2012, which is hereby incorporated by reference for all purposes as if fully set forth herein.

BACKGROUND OF THE INVENTION

1. Field of Invention

The present invention relates to an information security authentication system, and more particularly to, a symmetric dynamic authentication and key exchange system and a method thereof.

2. Related Art

With popularization of computers, networks and various wireless handheld information devices, lots of information exchange procedures between one person and the other person are completed gradually through computers and networks. However, in order to ensure the mutual confidence level for the both parties and the transfer confidentiality of information in a network in an information exchange procedure, a 3rd party certification authority is provided. After the both parties are authorized to perform certification at the certification authority, and obtain a public key and a private key for encryption/decryption, information transferred between the both parties may be encrypted/decrypted. When the certification authority is invaded, certification data recorded at the certification authority will also be leaked, so that a great quantity of information flows out and is malignantly used. Also, the encryption/decryption keys obtained by the both parties at the certification authority are fixed, and when the transferred information is skimmed, and cracked through a brute force attack method or cracked through a symmetric key algorithm, the transferred information does not have any confidentiality anymore.

Also, a conventional information transfer system is provided with an automatic repeat request fault-tolerant mechanism. Namely, when receiving erroneous transferred information, a receiving end sends repeat request information to a sending end, until the receiving end receives correct transferred information. This manner will place a burden on a network, and may also waste lots of time at the same time.

SUMMARY OF THE INVENTION

The present invention provides a symmetric dynamic authentication and key exchange system and a method thereof, and more particularly a symmetric dynamic authentication and key exchange system and a method thereof which can trace back to previous authentication and generate a next identity authentication code in advance.

The present invention proposes a symmetric dynamic authentication and key exchange system, which comprises a client and a server. The client obtains initial authentication information to generate first one-time temporary authentication information, a conference key and a standby identity identifier. The server is connected to the client through a network after obtaining the initial authentication information at the same time as the client, and obtains the initial authentication information of the client, the conference key, the first one-time temporary authentication information and the standby identity identifier, so as to perform a dynamic authentication program, in which the server compares the initial authentication information of the client with the conference key to confirm an identity of the client, and then updates the initial authentication information of the server according to the first one-time temporary authentication information, the server is enabled to have the first one-time temporary authentication information the same as that of the client, and the server is enabled to generate second one-time temporary authentication information comprising the standby identity identifier according to the first one-time temporary authentication information and the initial authentication information.

In an embodiment of the present invention, the client further comprises a client storage module, a client key generation module and a client communication module, the client storage module stores an initial identity identifier and an initial key contained in the initial authentication information, the client key generation module generates the first one-time temporary authentication information, the conference key and the standby identity identifier according to the initial identity identifier, and the client communication module transmits the first one-time temporary authentication information, the conference key and the standby identity identifier to the server through the network. The first one-time temporary authentication information is generated by the client key generation module through an authentication mechanism according to the initial authentication information, and the initial identity identifier and the initial key are stored in the client storage module in a temporary storage form.

In an embodiment of the present invention, the standby identity identifier refers to an identity identifier at a next stage generated in advance by the client in each authentication, and is used as an identity identification basis at the next stage accordingly.

In an embodiment of the present invention, the server further comprises a server storage module, a server authentication module and a server communication module, the server storage module stores an initial identity identifier and an initial key contained in the initial authentication information, and the server authentication module confirms the identity of the client according to the conference key and the initial authentication information stored in the server storage module, and generates second one-time temporary authentication information according to the first one-time temporary authentication information and the initial authentication information, so as to transmit the second one-time temporary authentication information to the client through the server communication module.

In an embodiment of the present invention, the system further comprises a service end, in which the service end transmits the initial authentication information to the client and the server at the same time when the client proposes an authentication request.

The present invention proposes a symmetric dynamic authentication and key exchange method, which comprises the following steps. First, a client and a server are enabled to obtain initial authentication information at the same time, and the client to is enabled generate first one-time temporary authentication information, a conference key and a standby identity identifier according to the initial authentication information. Then the client is enabled to be connected to the server through a network, and therefore the server is enabled to obtain the initial authentication information of the client, the conference key, the first one-time temporary authentication information and the standby identity identifier, so as to compare the initial authentication information of the client with the conference key to confirm the identity of the client, and to update the initial authentication information of the server according to the first one-time temporary authentication information. Finally, the server is enabled to generate second one-time temporary authentication information comprising the standby identity identifier according to the first one-time temporary authentication information and the initial authentication information.

In an embodiment of the present invention, the method further comprises a step of obtaining initial authentication information, and this step is as follows: first, a communication channel between the server and a service end is established, then an authentication request is proposed to the service end by the client, and finally, the initial authentication information is transmitted to the client and the server at the same time.

BRIEF DESCRIPTION OF THE DRAWINGS

The present invention will become more fully understood from the detailed description given herein below for illustration only, and thus are not limitative of the present invention, and in which.

DETAILED DESCRIPTION OF THE INVENTION

In order to make the aforementioned features and advantages of the present invention more comprehensible, embodiments are illustrated in detail hereinafter with reference to accompanying drawings.

Figure 1:
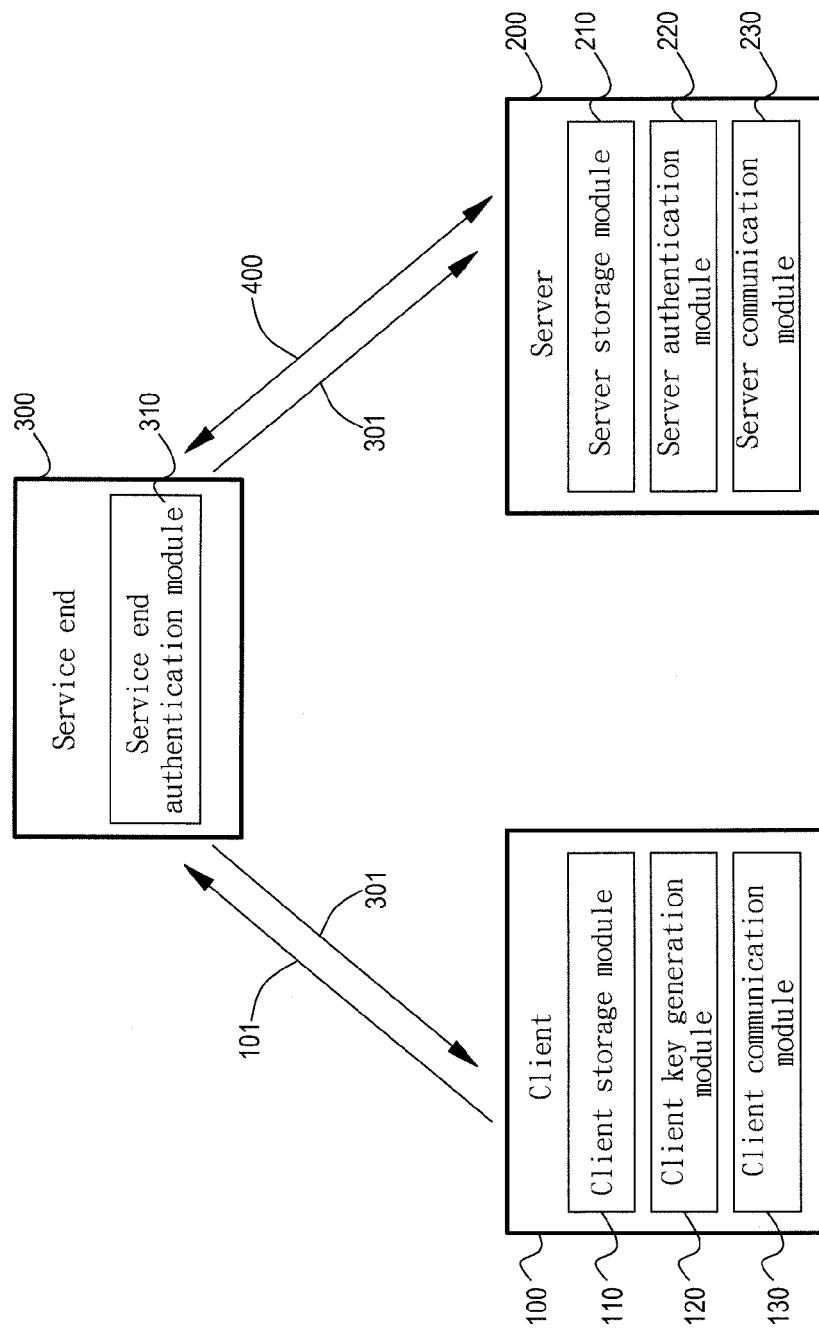
FIG. 1 is a block diagram of a symmetric dynamic authentication and key exchange system of the present invention.
Figure 2:
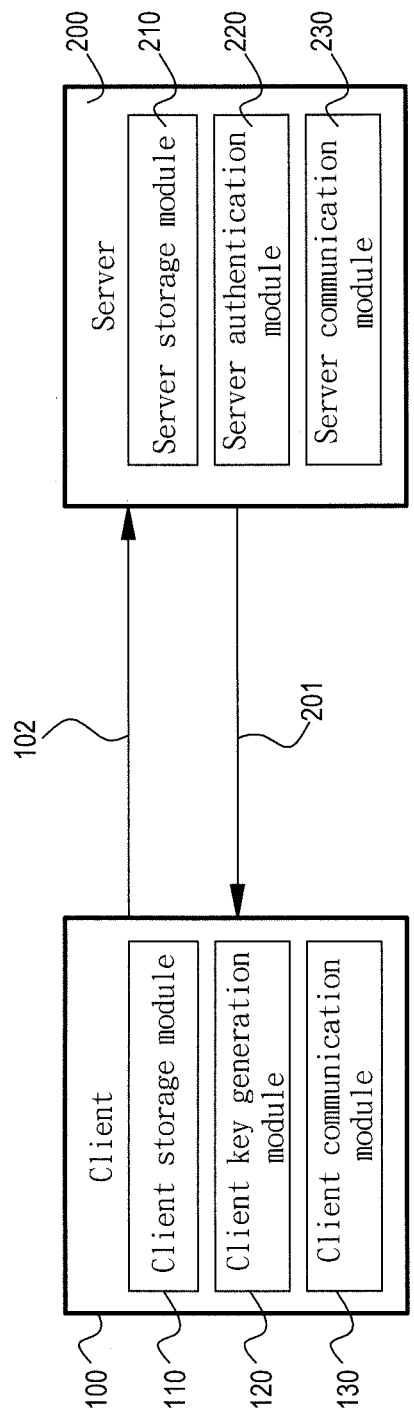
FIG. 2 is a perspective diagram of a connection relationship between a client and a server in FIG. 1.
Figure 3:
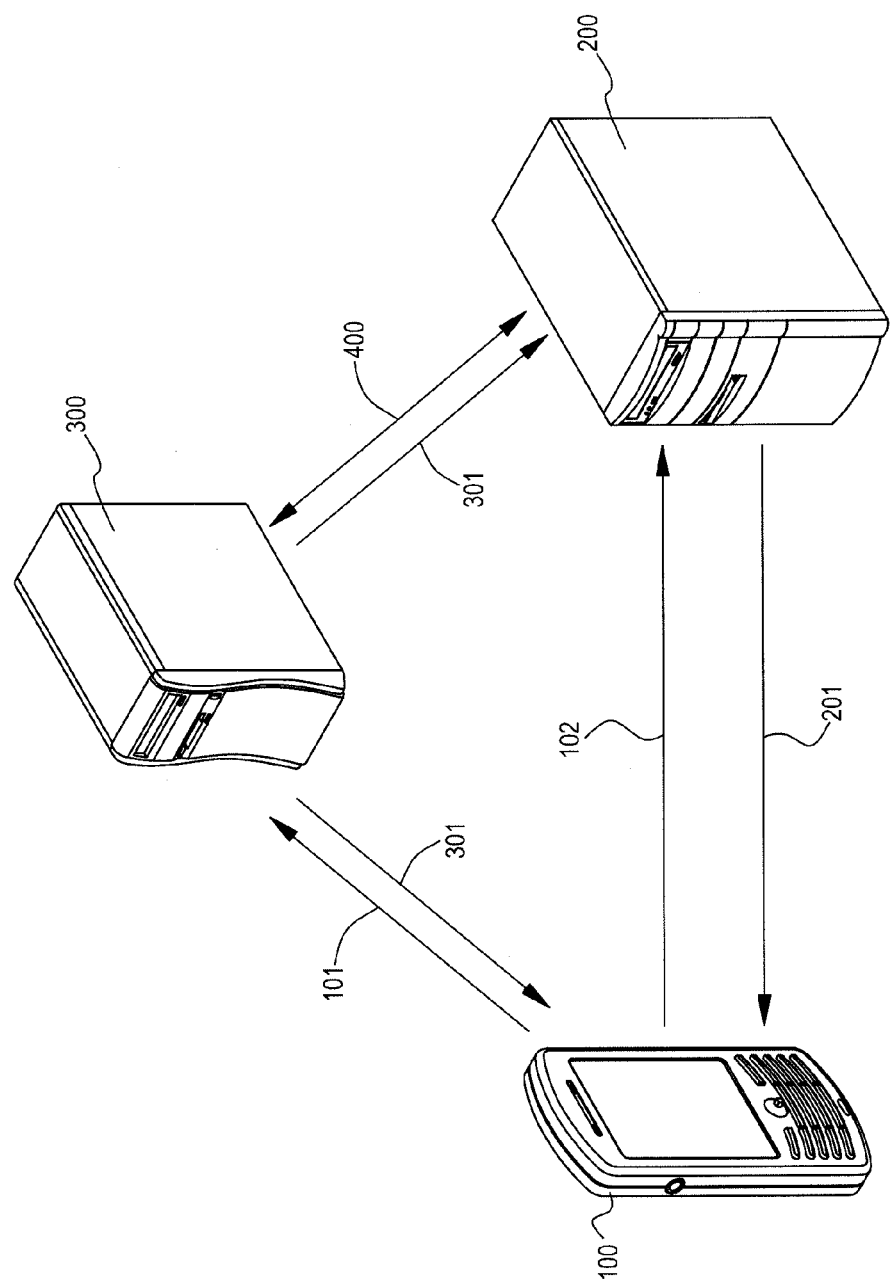
FIG. 3 is a perspective structural diagram of a service end, the client and the server of FIG. 1.

Referring to FIG. 1, FIG. 2 and FIG. 3 at the same time, FIG. 1 is a block diagram of a symmetric dynamic authentication and key exchange system of the present invention. FIG. 2 is a schematic diagram of a connection relationship between a client and a server in FIG. 1. FIG. 3 is a schematic structural diagram of a service end, the client and the server of FIG. 1.

Figure 5:
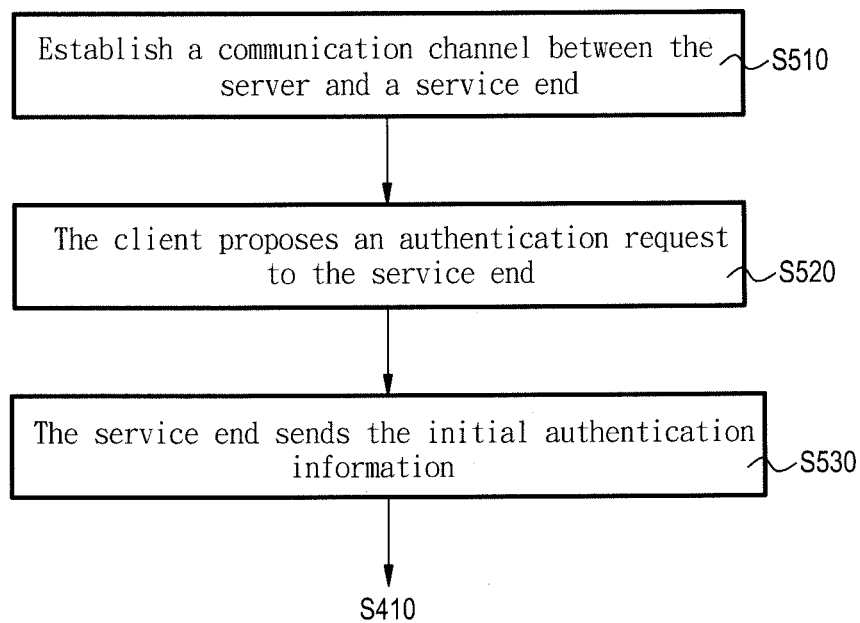
FIG. 5 is a flow chart of a method for obtaining initial authentication information of the present invention.

A flow chart of main details of FIG. 1 is shown in FIG. 5. Referring to steps of FIG. 5, a symmetric dynamic authentication and key exchange system includes a client 100, a server 200 and a service end 300. The server 200 and the service end 300 need to establish a communication channel 400 with high security (step S510). When the client 100 proposes an authentication request 101 (step S520), the service end 300 transmits generated initial authentication information 301 through a service end authentication module 310 (step S530), in which the initial authentication information 301 includes an initial identity identifier and an initial key.

Figure 4:
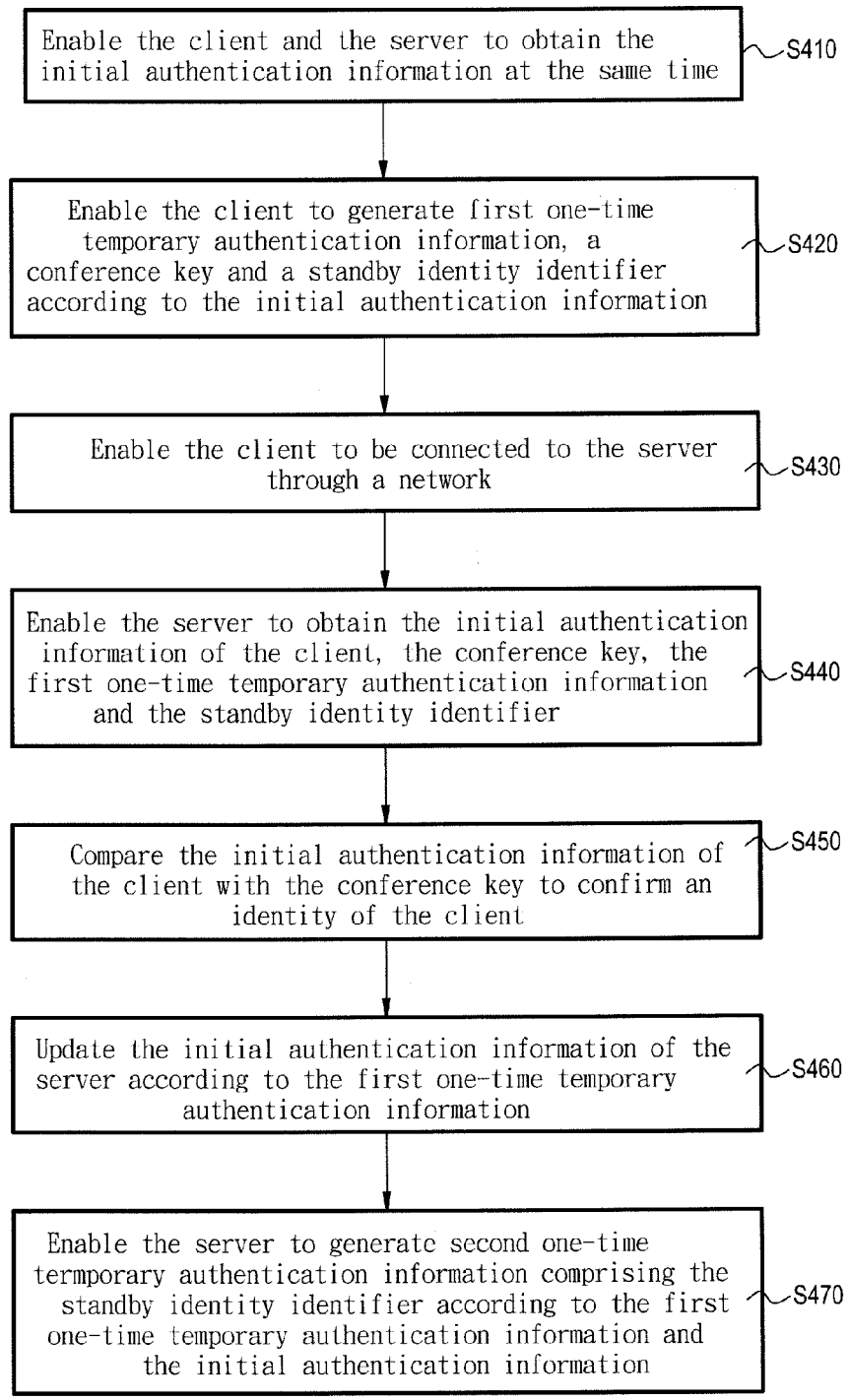
FIG. 4 is a flow chart of a symmetric dynamic authentication and key exchange method of the present invention.

A flow chart of main details of FIG. 2 is shown in FIG. 4. Referring to steps of FIG. 4, following FIG. 1, the client 100 and the server 200 obtain the initial authentication information 301 from the service end 300 at the same time (step S410). The client 100 includes a client storage module 110, a client key generation module 120 and a client communication module 130. The client storage module 110 stores an initial identity identifier and an initial key contained in the initial authentication information 301, and the client key generation module 120 generates a client authentication data packet 102 according to the initial identity identifier, in which this client authentication data packet 102 includes first one-time temporary authentication information, a conference key and a standby identity identifier (step S420).

The client authentication data packet 102 is transmitted to the server 200 through a network via the client communication module 130 (step S430). The first one-time temporary authentication information is generated by the client key generation module 120 through an authentication mechanism according to the initial authentication information 301. It is worth mentioning that the initial identity identifier and the initial key are stored in the client storage module 110 in a temporary storage form.

When the client 100 does not complete the authentication or the authentication fails, the client storage module 110 reserves the old identity identifier and key. The one-time temporary key authentication information aims to enable the server to confirm whether the client correctly owns the following values: a one-time temporary key (TK), an encryption key (delta) used for protecting the current authentication communication and a new one-time temporary key random number value (delta'). The identity authentication information aims to enable the server to authenticate an identity of the client.

The server 200 includes a server storage module 210, a server authentication module 220 and a server communication module 230. The server storage module 210 stores the initial identity identifier and the initial key contained in the initial authentication information 301, and the server authentication module 220 obtains the client authentication data packet 102 (step S440), then confirms the identity of the client 100 according to the conference key in the client authentication data packet 102 and the initial authentication information 301 stored in the server storage module 210 (step S450), and updates the initial authentication information 301 of the server 200 according to the first one-time temporary authentication information and the initial authentication information in the client authentication data packet 102 (step S460); the server 200 is enabled to have the first one-time temporary authentication information the same as that of the client 100, and the server 200 is enabled to generate a server authentication data packet 201 including the standby identity identifier and the second one-time temporary authentication information according to the first one-time temporary authentication information and the initial authentication information (step S470).

During registration, a key (TK) and an identity identifier (TID) are stored in the client 100 and the server 200 respectively, and after successful authentication is completed once, values of the identity identifier (TID) and the key (TK) are updated. During authentication, before the values of the identity identifier (TID) and the key (TK) are updated, these two values are stored in temporary variables: a temporary storage key (pTK) and a temporary storage identity authentication code (pTID) in the protocol, so as to ensure that in a situation that authentication is not completed or is interrupted (another party may update neither the key (TK) nor the identity identifier (TID)), C0' generated by the temporary storage key (pTK) and the temporary storage identity authentication code (pTID) may also be used to continue to complete authentication in a new round of authentication. Therefore, the storage here refers to that the key (TK) and the identity identifier (TID) are stored in these two variables: the temporary storage key (pTK) and the temporary storage identity authentication code (pTID). When the client 100 receives authentication information and completes verification, these two values: the temporary storage key (pTK) and the temporary storage identity authentication code (pTID) are flushed.

To sum up, in the present invention, a security channel is established between the service end and the server end to transmit information, and therefore the service end mainly forwards authentication information. The server end transmits the value required for generating the conference key to the service end through the security channel at the same time when the client and the server end complete authentication. After authentication is completed, the client and the service end can encrypt communication information through the conference key.

Although the present invention has been disclosed through the foregoing embodiments, they are not intended to limit the present invention. Equivalent replacements of variations and modifications made by persons skilled in the art without departing from the spirit and the scope of the present invention still fall within the protection scope of the present invention.

What is claimed is:

1. A symmetric dynamic authentication and key exchange system, comprising:
    a client, for obtaining initial authentication information to generate first one-time temporary authentication information, a conference key and a standby identity identifier; and
    a server, connected to the client through a network after obtaining the initial authentication information at the same time as the client, for obtaining the initial authentication information of the client, the conference key, the first one-time temporary authentication information and the standby identity identifier, so as to perform a dynamic authentication program,
    wherein the server compares the initial authentication information of the client with the conference key to confirm an identity of the client, and then updates the initial authentication information of the server according to the first one-time temporary authentication information, the server is enabled to have the first one-time temporary authentication information the same as that of the client, and the server is enabled to generate second one-time temporary authentication information comprising the standby identity identifier according to the first one-time temporary authentication information and the initial authentication information.

2. The symmetric dynamic authentication and key exchange system according to claim 1, wherein the client further comprises a client storage module, a client key generation module and a client communication module, the client storage module stores an initial identity identifier and an initial key contained in the initial authentication information, the client key generation module generates the first one-time temporary authentication information, the conference key and the standby identity identifier according to the initial identity identifier, and the client communication module transmits the first one-time temporary authentication information, the conference key and the standby identity identifier to the server through the network.

3. The symmetric dynamic authentication and key exchange system according to claim 2, wherein the first one-time temporary authentication information is generated by the client key generation module through an authentication mechanism according to the initial authentication information.

4. The symmetric dynamic authentication and key exchange system according to claim 2, wherein the initial identity identifier and the initial key are stored in the client storage module in a temporary storage form.

5. The symmetric dynamic authentication and key exchange system according to claim 1, wherein the server further comprises a server storage module, a server authentication module and a server communication module, the server storage module stores an initial identity identifier and an initial key contained in the initial authentication information, and the server authentication module confirms the identity of the client according to the conference key and the initial authentication information stored in the server storage module, and generates second one-time temporary authentication information according to the first one-time temporary authentication information and the initial authentication information, so as to transmit the second one-time temporary authentication information to the client through the server communication module.

6. The symmetric dynamic authentication and key exchange system according to claim 1, further comprising a service end, wherein the service end transmits the initial authentication information to the client and the server at the same time when the client proposes an authentication request.

7. The symmetric dynamic authentication and key exchange system according to claim 1, wherein the standby identity identifier refers to an identity identifier at a next stage generated in advance by the client in each authentication, and is used as an identity identification basis at the next stage accordingly.

8. A symmetric dynamic authentication and key exchange method, comprising the following steps:
    enabling a client and a server to obtain initial authentication information at the same time;
    enabling the client to generate first one-time temporary authentication information, a conference key and a standby identity identifier according to the initial authentication information;
    enabling the client to be connected to the server through a network;
    enabling the server to obtain the initial authentication information of the client, the conference key, the first one-time temporary authentication information and the standby identity identifier;
    comparing the initial authentication information of the client with the conference key to confirm an identity of the client;
    updating the initial authentication information of the server according to the first one-time temporary authentication information; and
    enabling the server to generate second one-time temporary authentication information comprising the standby identity identifier according to the first one-time temporary authentication information and the initial authentication information.

9. The symmetric dynamic authentication and key exchange method according to claim 8, wherein the step of enabling a client and a server to obtain initial authentication information at the same time comprises:
    establishing a communication channel between the server and a service end;
    proposing an authentication request to the service end by the client; and
    transmitting the initial authentication information to the client and the server at the same time.

* * * * *